Sept. 12, 1933.    F. GRAY    1,926,279

VARIABLE SPEED GEAR

Filed Nov. 5, 1931    2 Sheets-Sheet 1

Sept. 12, 1933.  F. GRAY  1,926,279
VARIABLE SPEED GEAR
Filed Nov. 5, 1931  2 Sheets-Sheet 2
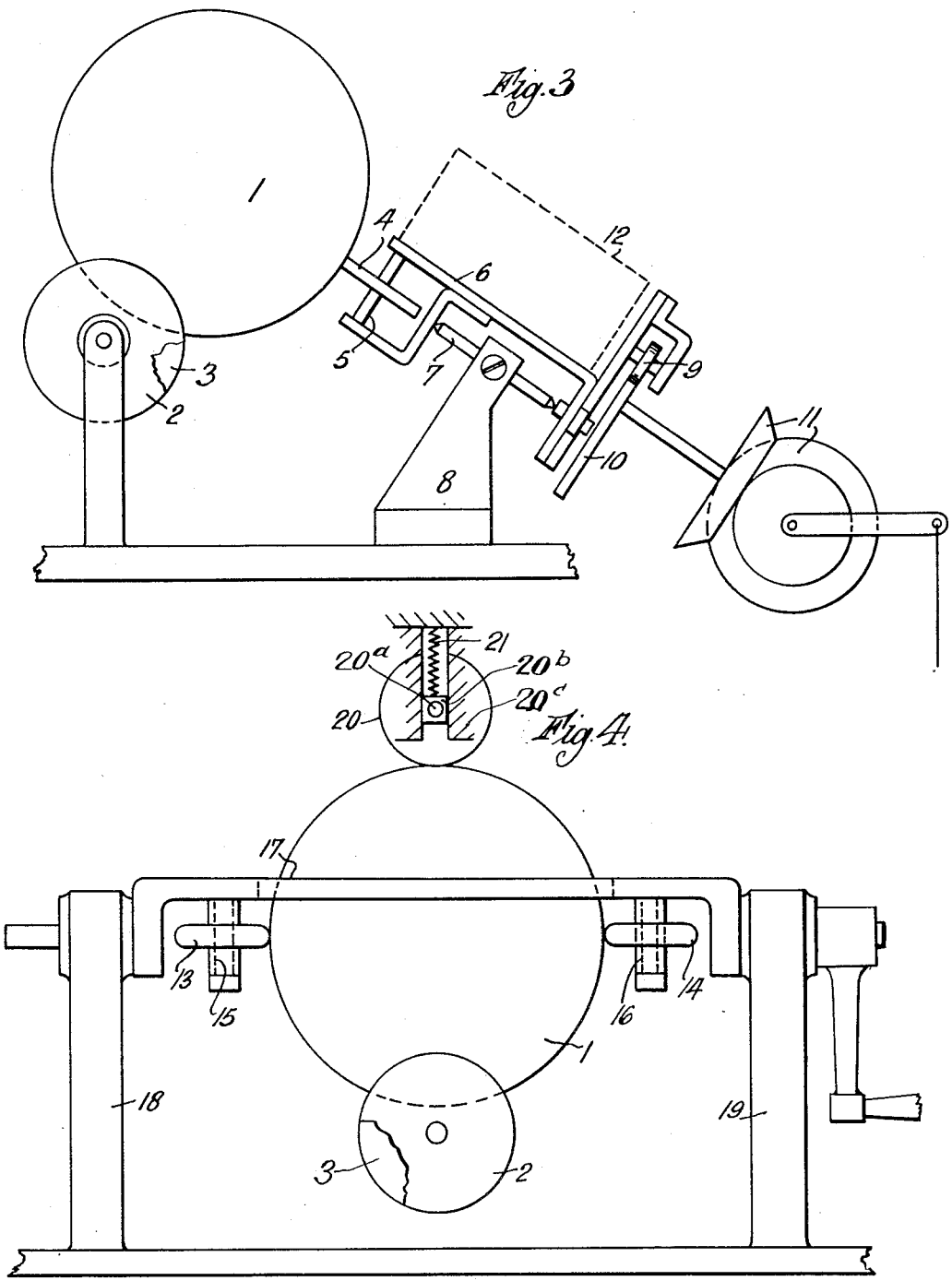

Patented Sept. 12, 1933

1,926,279

UNITED STATES PATENT OFFICE 1,926,279

VARIABLE SPEED GEAR

Ffolliott Gray, Luton, England, assignor to George Kent, Limited, London, England Application November 5, 1931, Serial No. 573,272, and in Great Britain July 31, 1931

7 Claims. (Cl. 74—26)

This invention relates to improvements in variable speed gear, and is particularly applicable for use in transmitting small powers, such as are required for integrating apparatus or driving sewing machines.

Variable speed mechanism constructed according to the present invention comprises a sphere, means for rotating the said sphere, a roller which is in contact with and is driven by said sphere, and means for altering the position of the axis about which the sphere rotates.

Figure 1:
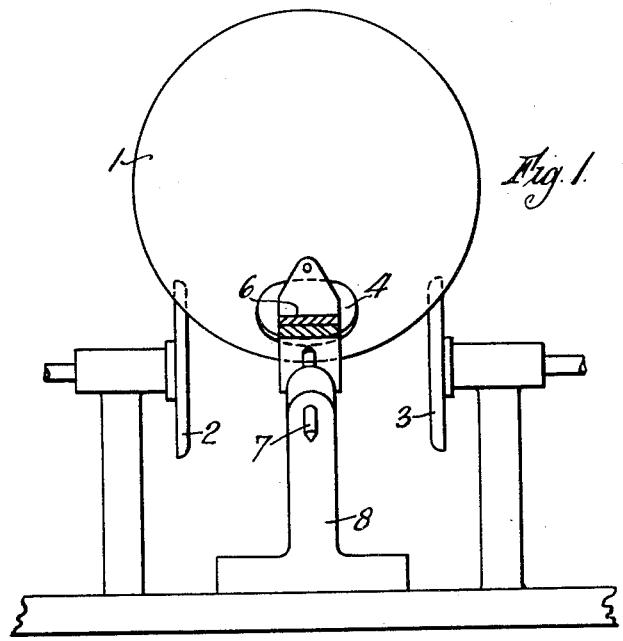
Figure 2:
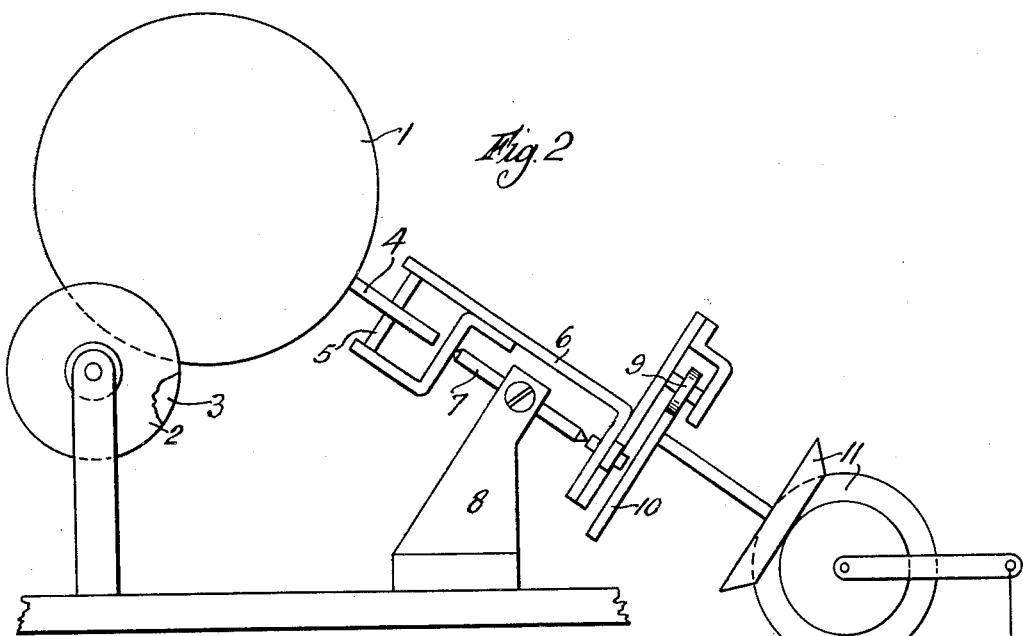

The invention is illustrated in the accompanying drawings in which Figures 1 and 2 are views at right angles to one another of one form of construction and Figures 3 and 4 diagrammatic views of modified arrangements.

Referring more particularly to Figures 1 and 2, the apparatus comprises a sphere 1 which is in frictional contact with three rollers 2, 3, 4 of which the roller 2 is the driving roller and causes the sphere to rotate, the roller 3 is a roller driven by the sphere and transmits motion to the mechanism to be driven and the roller 4 which is so arranged that its axis of rotation can be angularly displaced.

The axes of the driving and driven rollers 2—3 lie in a common plane passing through the center of the sphere and, as shown, are coincident, that is, the rollers 2—3 rotate about a common axis. The third roller 4 preferably is arranged so that its axis, in all positions of angular displacement, lies in a plane parallel to the plane containing the the common axis of the rollers 2—3 and passing through the center of the sphere. The roller 4 contacts with the sphere at a point situated ninety degrees of the arc of the sphere away from each point of contact of the rollers 2 and 3, and the angle subtended by the arc between the points of contact of the rollers 2 and 3 also conveniently may be ninety degrees.

With such an arrangement the axis of rotation of the sphere 1 will be parallel with the axis of the third roller 4, and thus any angular displacement of the axis of the third roller will cause a corresponding alteration of the position of the axis about which the sphere rotates and an alteration in the speed of the driven roller relatively to that of the driving roller. This will be clear when it is considered that the sphere, in contact with the roller 4, will have a natural tendency to rotate about such an axis that it will have only rolling contact with the periphery of the roller 4, i. e., the sphere 1 will rotate in a plane parallel to the plane of the roller 4 and consequently the axis of rotation of the sphere will be parallel to the axis of rotation of the roller 4. If, now, the axis of rotation of the roller 4 is changed, in order for the sphere 1 to have rolling contact only with the roller, the axis of rotation of the sphere will assume a position parallel with that of the roller; otherwise there would have to be a slip occurring between the surface of the roller and the sphere. Such a relative slip would cause the absorption of more energy than that occasioned by merely rolling the sphere against the roller 4, and the axis of rotation of the sphere therefore naturally assumes a position in which there is no slip and the least resistance to rotation, namely, a position parallel to the axis of the roller 4.

In the use of the apparatus as an integrating mechanism, for example, the driving roller 2 would be driven at a rate dependent on the value of one of the factors of the integration to be effected while the angular displacement of the roller 4 would be dependent on the value of the other factor. For example, if the apparatus described be employed for integrating the product of the travel of a rope and the tension thereon so as to obtain the amount of work done by the rope, the roller 2 would be driven proportionally to the travel, the roller 4 would be displaced to an extent dependent on the tension in the rope.

It may also be used for integrating the total quantity of fluid passed in a pipe or conduit, the driving roller 2 being rotated at a constant speed by a clock or other driving member, and the angular displacement of the axis of the third roller being varied by the movement of a rate-of-flow measuring device.

The angular displacement of the roller 4 can conveniently be effected by mounting the roller on a spindle 5 inclined to the vertical and rotatably mounted in a bracket 6 itself mounted to rock about a spindle 7 secured in a bracket 8, the spindle 7 passing through the center of the sphere and being perpendicular to the axis of the spindle 5. The bracket 6 is provided with a roller 9 engaging a cam 10 which is moved through gearing 11 the cam being shaped so as to cause such angular displacement of the bracket and hence of the roller 4 as will give correct ratio of rotation between the rollers 2 and 3. The relative positions of the rollers 2, 3, and 4 are such that the rollers provide a three point support for the sphere 1.

In a further modification, the angularly displaceable roller 4 also forms the driving roller, the driving roller 2 referred to in the arrangement shown in Figures 1 and 2 being replaced by any suitable supporting means as, for example, by converting the driving roller 2 into an idle roller.

Such an arrangement is illustrated in Figure 3 in which the roller 4 is driven at a constant rate by a clock 12 mounted on the bracket 6.

In all cases, means may be provided for causing increased pressure between the sphere and the rollers.

One way of carrying this into effect is illustrated in Figure 4 in which the single roller 4 is replaced by two diametrically opposite rollers 13, 14 mounted to rotate on spindles 15, 16 carried by a common frame 17 which is mounted to rock in supports 18, 19 to effect angular displacement of the rollers 13, 14 contact between the rollers and the sphere is provided either by the resiliency of the supports or by resiliency of the sphere or in any other manner.

In the embodiment shown in Figure 4 an additional roller 20 is mounted to rotate about an axis lying in the plane containing the axes of the rollers 2 and 3. As shown, the roller 20 is mounted on a pin 20a supported in a bearing block 20b slidable in a slot formed in a fixed part 20c, the roller being urged into contact with the sphere 1 by a spring 21 interposed between the top of the bearing block 20b and the base of the slot in the fixed part 20c. The roller 2 may be employed as the driving and the roller 3 as the driven roller, or one or the other or both the rollers 13—14 may be employed for driving. The rollers 13 and 14 lie in a common plane and together cooperate with the rollers 2 and 3 to maintain the sphere in a position directly above the axes of the rollers 2 and 3. The axes of rotation of the rollers 13 and 14 may be shifted so as to cause a displacement of the axis of rotation of the sphere—as was explained above with reference to the Figures 1 and 2 construction—by means of any suitable operating device such as a crank 22 fast with a journal 23 of the frame 17, the crank being adapted to be shifted in accordance with variations of a value to be integrated.

In all the arrangements of apparatus described above when functioning correctly there is rolling contact, without either tangential or side slip, at all points of contact between the sphere and the rollers. It is necessary that the torque required to be transmitted to the driven shaft, and the speed of the driven shaft relative to that of the driving shaft shall not be sufficient to cause such slip.

The absence of both tangential and side slip is due to the fact that the rollers are positioned relative to each other in such manner that a line drawn from the point of contact of the third or controlling roller with the sphere to the center of the sphere is perpendicular to a plane containing the common axis of the rollers 2—3 and the center of the sphere.

What I claim is:

1. The combination of a sphere, two spaced rollers mounted for rotation about a common axis and in contact with said sphere, a frame pivoted on an axis passing through the center of said sphere and perpendicular to a plane passing through said common axis and the center of the sphere, a third roller mounted on said frame with its axis perpendicular to and intersecting the pivotal axis of said frame and having its periphery in contact with said sphere, and means connected to said frame for rocking the latter about its pivotal axis, one of said rollers being a driving roller and another being a driven roller.

2. The combination of a sphere, two spaced rollers mounted for rotation about a common axis and in contact with said sphere, a frame pivoted on an axis passing through the center of said sphere and perpendicular to a plane passing through said common axis and the center of the sphere, a third roller mounted on said frame with its axis perpendicular to the pivotal axis of said frame and having its periphery in contact with said sphere, a cam follower on said frame, and a cam in engagement with said follower and being movable for rocking said frame about its pivotal axis, one of said rollers being a driving roller and another being a driven roller.

3. The combination of a sphere, two rollers mounted for rotation about a common axis and in contact with said sphere, a third roller, a frame, means mounting said frame for movement about an axis passing through said sphere, and means mounting said third roller on said frame to contact said sphere and with the axis of said third roller and said frame axis intersecting in the plane of said third roller, a line drawn from the point of contact of said third roller with said sphere to the center of said sphere being perpendicular to a plane containing said common axis and the center of said sphere, one of said rollers being a driving roller and another being a driven roller.

4. The combination of a sphere, two rollers mounted for rotation about a common axis and in contact with said sphere, a third roller, a frame, means mounting said frame for movement about an axis passing through said sphere, means mounting said third roller on said frame to contact said sphere and with the axis of said third roller and said frame axis intersecting in the plane of said third roller, a line drawn from the point of contact of said third roller with said sphere to the center of said sphere being perpendicular to a plane containing said common axis and the center of said sphere, one of said rollers being a driving roller and another being a driven roller, and means connected to said frame and being operable in dependence upon changes in a variable for moving said frame about its axis independently of the speed of rotation of any of said rollers.

5. The combination of a sphere, two rollers mounted for rotation about a fixed common axis and in contact with said sphere, a third roller in contact with said sphere, a spindle mounting said third roller, a line drawn from the point of contact of said third roller with said sphere to the center of said sphere being perpendicular to a plane containing said common axis and the center of said sphere and means connected to said spindle and being operable for changing the angularity of the latter with respect to said common axis, one of said rollers being a driving roller and one a driven roller.

6. The combination defined in claim 2 including mechanism for rotating the driving roller at a constant speed.

7. The combination of a sphere, two rollers mounted for rotation about a common axis and in contact with said sphere, third and fourth rollers, a frame, means mounting said frame for movement about an axis passing through said sphere, and means mounting said third and fourth rollers on said frame to contact said sphere and with the axes of said third and fourth rollers and said frame axis intersecting in the planes of said third and fourth rollers respectively, a line drawn from the points of contact of said third and fourth rollers with said sphere to the center of said sphere being perpendicular to a plane containing said common axis and the center of said sphere, one of said rollers being a driving roller and another being a driven roller.

FFOLLIOTT GRAY.